Dec. 10, 1946.                D. G. HUNTER                2,412,507
                        PHOTOGRAPHIC MASKING EASEL
                    Filed April 12, 1944        3 Sheets-Sheet 1
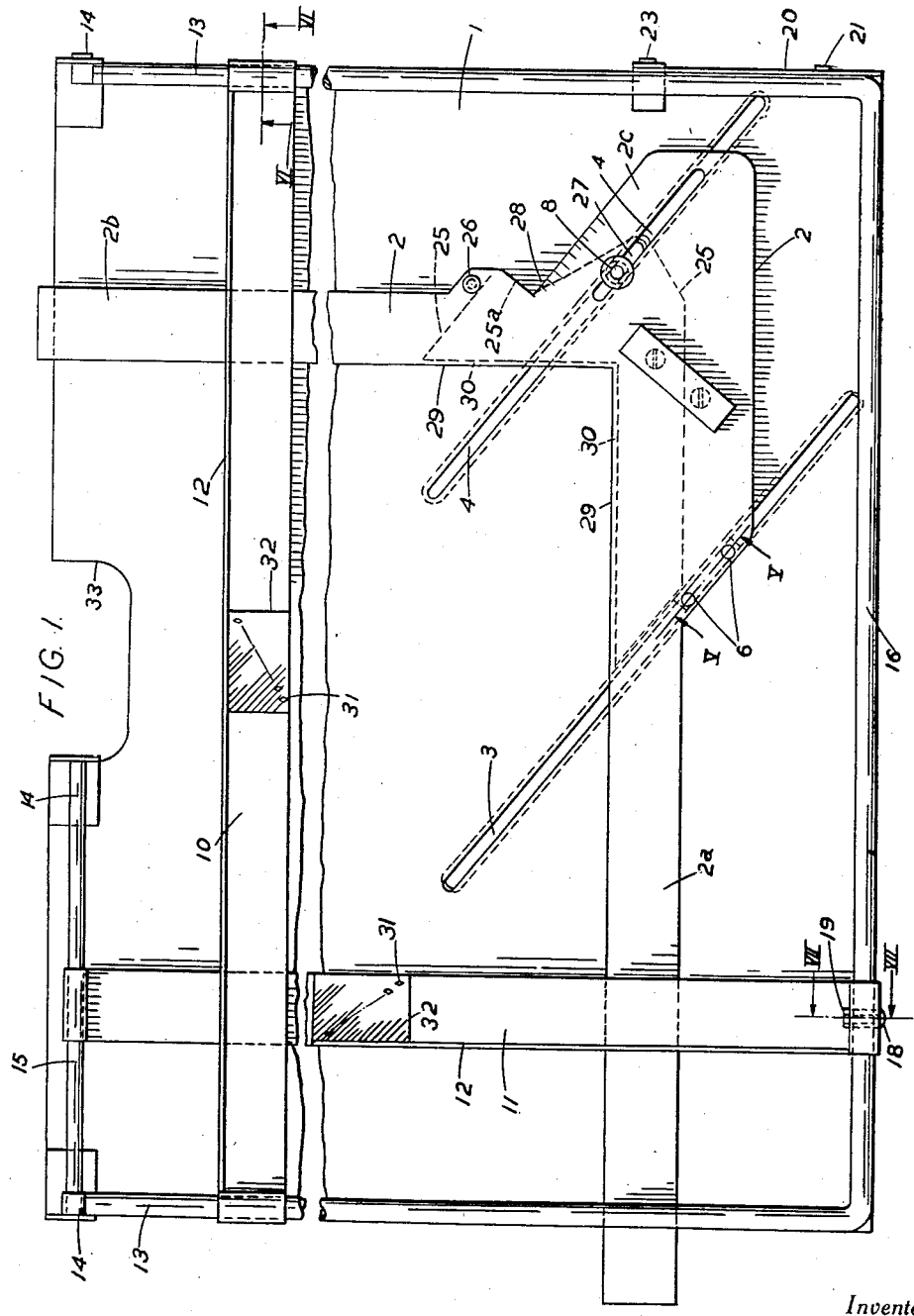
Inventor
Douglas Gordon Hunter
By
Henry A. Hornidge
Attorney Dec. 10, 1946.  D. G. HUNTER  2,412,507
PHOTOGRAPHIC MASKING EASEL
Filed April 12, 1944  3 Sheets-Sheet 2
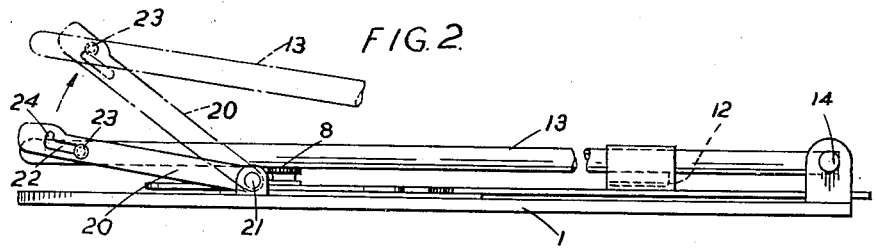
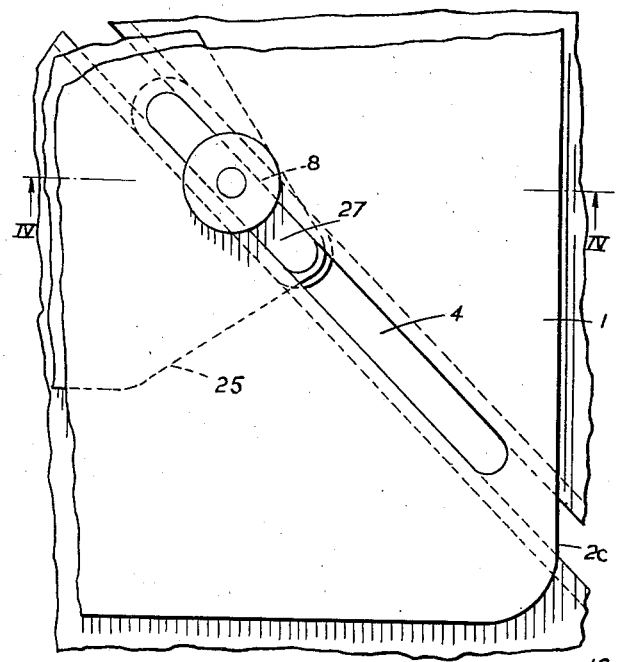
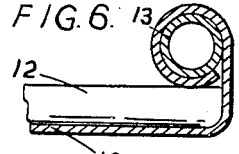
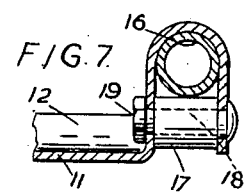
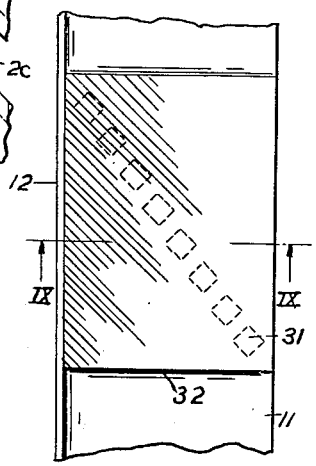
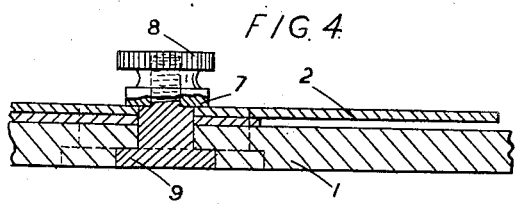
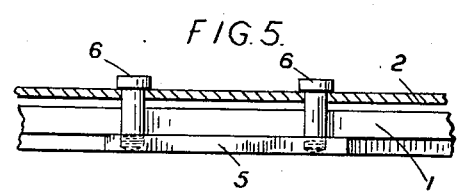
Inventor
Douglas Gordon Hunter
By
Henry J. Horridge
Attorney

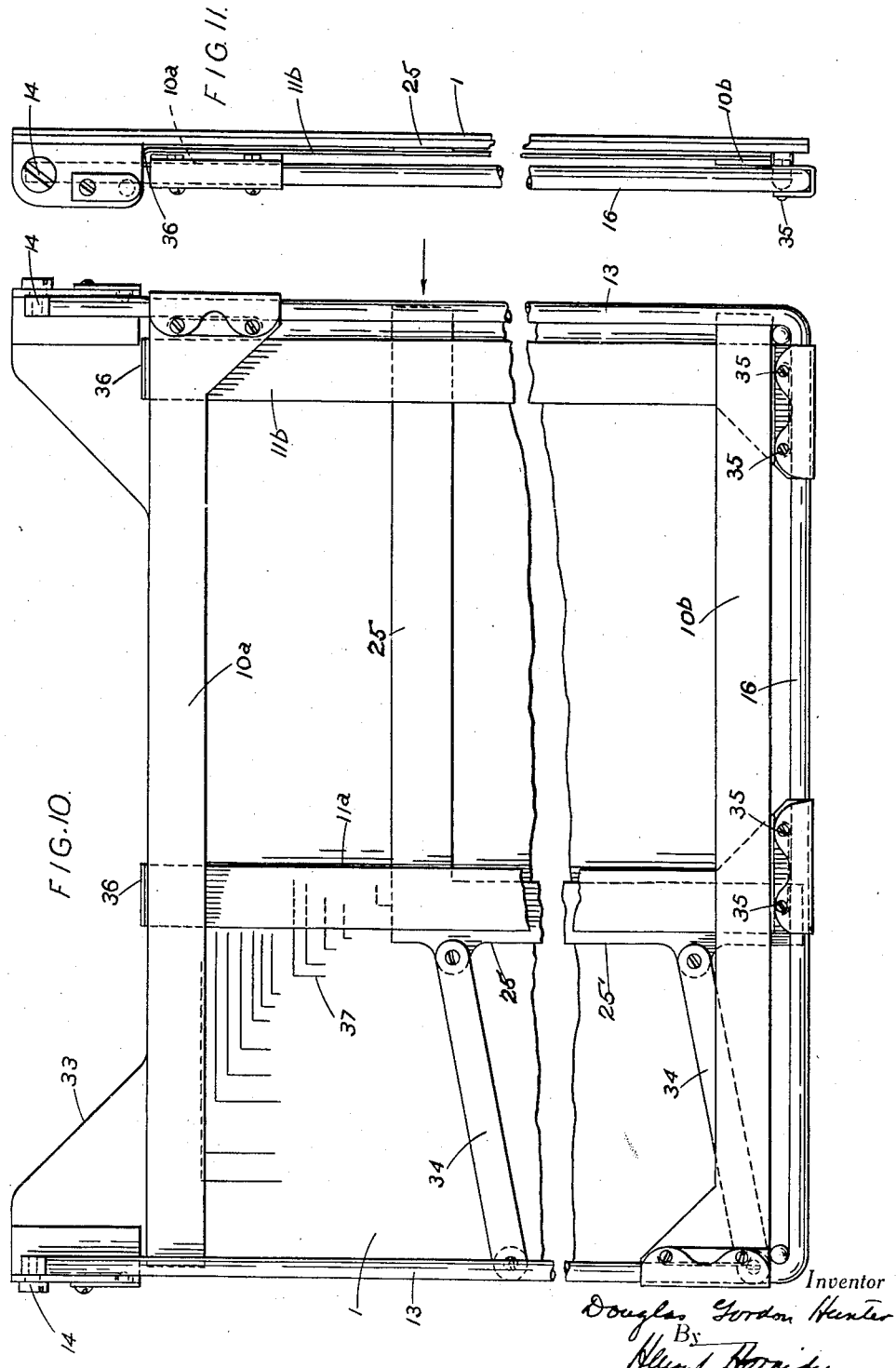

Patented Dec. 10, 1946

2,412,507

UNITED STATES PATENT OFFICE 2,412,507

PHOTOGRAPHIC MASKING EASEL

Douglas Gordon Hunter, London, England, assignor to Barnet Ensign Limited, London, England, an English joint-stock company Application April 12, 1944, Serial No. 530,606
In Great Britain May 8, 1943

10 Claims. (Cl. 88—24)

This invention relates to boards or tables for supporting the sensitised material during the exposure of photographic enlargements or prints and in particular to masking devices for use on such boards or tables enabling the exposed surface to be centralised and symmetrical unexposed margins to be provided for.

The most usual arrangements for positioning and masking the sensitised material in making enlargements consists in providing a fixed positioning T-piece on the exposure board extending to one corner of the board and two flat straight pieces adjustable from and towards each of the limbs of the T-piece respectively while remaining each parallel to one of these limbs. A form of construction has, however, been proposed with a frame hinged to the board and four flat steel masking blades of which each pair were to be guided in the side members of the hinged frame.

According to the present invention a member with two limbs at right angles is mounted on the board so as to be adjustable to and from one corner of the latter in such a way that the edges of the member take up positions which are parallel to one another, and in addition a pair of straight blades are provided in such a way that they are guided and maintained parallel with the respective edges of the two limbs of the right-angled member; in fact they are guided by engagement with bars extending along the edges of the board. In this way a rectangular masked area of any desired size may be set up in the centre of the exposure board.

Conveniently the right-angled member may be guided by providing it with members which can slide in inclined parallel slots in the board arranged so that the member can be clamped in any adjusted position. It is preferred to make the straight blades slidable on the members of a rectangular frame which is hinged to the board so that it can be raised and lift the straight blades with it in order to permit the sensitized material to be placed in position. As a refinement the hinged frame may be provided with a pivoted latch which serves as a strut to hold the frame in the raised position during the preliminary adjustments.

However, as an alternative it is possible to mount the right-angled member by connecting one of its limbs to the ends of the links of parallelogram linkage in which instance four independent straight masking blades are guided with the bars mutually at right angles and these are employed for masking off the desired unexposed margin or border. However, the right-angled member and the pair of straight blades used with it may be arranged to overlie the edges of the sensitised material to provide an unexposed margin of any desired width. In that case a subsidiary right-angled piece or corner piece may be provided located beneath the main right-angled member in the vicinity of its right angle and guided by one of the inclined slots and a guide pin or roller for locating the corresponding corner of the sensitised material and for regulating the width of the unexposed margin. In such a case it is desirable to be able to regulate the width of the margin on the other two sides by precise setting of the straight blades and in order to make it possible to see how far the sensitized material extends under these blades each is formed with a series of windows over a restricted area and at different distances across the width of the blade through which the edge of the sensitised material may be inspected. In order to avoid an exposure through these windows they may be covered with a transparent material of such a colour that it only passes a safe light to enable the edge of the sensitised material to be seen.

In order to explain the invention more fully, two forms of the novel exposure board and masking device will now be described, but purely by way of example, with reference to the accompanying drawings, in which:

Figure 1 is a plan of the complete device in one form;

Figure 2 is a side elevation seen from the right of Figure 1;

Figure 3 is an enlarged plan view of part of the board in the neighbourhood of the lower right-hand corner;

Figure 4 is a section through part of the board on the line IV—IV in Figure 3;

Figure 5 is a section through part of the board on the line V—V in Figure 1;

Figure 6 is a detailed section on the line VI—VI in Figure 3 showing the method of guiding one of the masking blades on the side members of the hinged frame;

Figure 7 is a similar section on the line VII—VII in Figure 1 but showing an attachment for one of the masking blades along the edge of the frame opposite to the hinge;

Figure 8 is an enlarged plan showing the arrangement of the margin inspection window in one of the blades;

Figure 9 is a section through this blade on the line IX—IX in Figure 8; while

Figure 10 is a plan view of an alternative arrangement and

Figure 11 is a side of this alternative arrangement seen from the right of Figure 10.

In the form of construction shown in Figures 1 to 9, the supporting board or table is indicated at 1 and the right-angled member adjustably mounted on the board 1 is seen at 2, it being noted that it is substantially in the form of a square arranged when adjusted to slide so that its two limbs 2a and 2b always take up positions along parallel lines. This member 2 is moved to and from the lower right-hand corner of the board 1 while being guided in parallel inclined slots 3 and 4. In the slot 3 a strip 5 can slide and this strip is carried from the member 2 by two screws 6; this is shown in detail in Figure 5. As regards the slot 4, however, the member 2 is guided by means of a screw 7 provided with a nut 8 and with an extended head 9 which slides in the slot 4. The screw fits in the member 2, as shown in Figure 4, so that as the slots 3 and 4 are parallel, on loosening the nut 8 the member 2 can be adjusted and then locked in the adjusted position by tightening the nut 8.

In this form of construction the mask is completed by two straight blades 10, 11. These blades have one edge 12 upstanding (see Figure 9) and this edge can be grasped by the fingers to cause the blades to slide parallel respectively to the two arms 2a and 2b of the member 2. In fact, the blade 10 encircles at each end one of the side members 13 of the tubular framework which is pivoted to the board 1 by hinges 14. One end of the member 10 is shown in detail in Figure 6 which indicates clearly that the end of the blade 10 is curled to embrace the tubular side member 13 of the frame. The arrangement is the same at both ends of the member 10 which can therefore be caused to slide fairly freely on the frame members 13.

The other blade 11 at one end encircles the hinge pin 15, being curled around it in much the same way as indicated in Figure 6. At the other end, however, it has to slide on the outer tubular member 16 of the frame and in this case it is curled over the top of the tubular member 16 as shown in Figure 7. A spacing sleeve 17 is inserted between the limbs of the end part of the blade 11 and a bolt 18 passes through the sleeve 17 and the whole joint is tightened up by a nut 19. It will be observed that this arrangement, while allowing the members 10 and 11 to slide, allows them to be lifted off the board for the preliminary adjustment of the paper on which an enlargement is to be made. In order to free both hands of the operator the frame may be latched up in the raised position by means of a latch 20 shown in Figures 1 and 2. This is of sheet metal pivoted to the board 1 at 21 and having a locking slot 22 engaging a pin 23 extending from the side member 13 of the frame. When the frame is lifted the pin 23 is able to engage a side branch 24 of the slot 22 and becomes locked with the frame raised, as shown in dotted lines in Figure 2. By pressing down the pin 23 the frame can, of course, be depressed to bring the blades 10, 11 onto the sensitive paper.

By this means a rectangular area for exposure of any desired size can be set up centrally on the board. The member 2 and the blades 10, 11 are mounted so that the edges of the sensitised material can extend under them to provide an unexposed margin of any desired width around the enlargement.

A subsidiary right-angled piece 25 is placed below the member 2 about the corner of the latter and is guided by the slot 4 and by a roller 26 mounted on an upstanding pin and bearing on one inclined edge of the right-angled piece 25. As can be seen from Figures 1, 3 and 4, the bolt 7 has a rectangular part extending through a slot 27 in the piece 25 but shorter than the slot 4 in the member 2. This serves to guide the right-angled piece 25 but limits its movement to an extent depending on the length of the slot 27. The rearward extension 2c of the member 2 is provided with graduations along one end of its edges at 28 against which the edge 25a of the right-angled piece 25 which slides beneath them is read. Each graduation corresponds to a certain width of the margin which is indicated in Figure 1 as the distance between the edge 29 of the member 2 and the edge 30 of the piece 25 about the corners of the members.

The opposite edges of the sensitised material pass under the two straight blades 10, 11, as already indicated, and in order to set the margin along these edges, the members 10, 11 at one point in the length of each are punched with a number of small windows 31 extending diagonally across a rectangular area and shown in greater detail in Figures 8 and 9, which are views of a section of the straight blade 11. The edge of the sensitised paper can be seen through one or other of these windows 31 but in order that the paper may not be exposed through these windows they are covered by a layer of transparent material 32 secured to the upper surface of the blade 10 or 11. This material 32 is transparent but of a colour only to pass a safe light which will not affect the bromide paper or other sensitive material beneath it.

It will be appreciated that the frame 13, 16 is heavy enough to hold down during exposure. It will also be noted that the edge of the board 1 on the hinge side is cut away at 33 near the middle of its length to accommodate the standard of the enlarger if necessary.

In the modified form shown in Figure 10, the main features follow those of Figures 1 to 9. Thus, the board 1 is shaped at 33 to accommodate the standard of the enlarger and a tubular frame 13, 16 is pivoted to the board 1 about hinges 14. In this case, however, the right angle piece 25 which corresponds to right angle piece 25 of Fig. 1 is arranged for the limb 25' thereof to form one member of a parallelogram linkage, the side links of which are shown at 34 and are pivoted to the board 1 at the left hand ends and to the limb 25' at the right hand ends. This ensures of course that the member 25 can move to and from the left hand upper corner of the board 1 with its edges taking up positions along parallel lines. In this case the angle of the member 25 is intended to serve as the locator for the sensitive material, the corner of which abuts against the inside corner of the member 25. The masking is effected in this case by means of four independently slidable blades 10a 10b, 11a, 11b, which are arranged to overlap the edge of the sensitised material so that again a central area for exposure of any desired size can be set up.

The blades 11a and 11b are curled around the outer member 16 of the hinged frame and are secured to it by screws 35 so that they can both slide on this member. Their opposite ends are slightly turned up, as seen at 36. The blade 10a is similarly arranged to slide on the right-hand frame member 13 and the blade 10b on the left-hand tubular member 13 of the frame. No special arrangements are made here for indicating the width of the unexposed margin but to assist in this the board is provided with ruled rectangles, as indicated at 37 in a very usual fashion.

What I claim is:

1. An exposure and masking appliance for photographic sensitized material, comprising a substantially rectangular board for supporting the sensitised material and formed with a pair of parallel slots inclined to the edges of said board and extending from the neighborhood of one corner of said board, a square or member with two arms having their inner edges at right angles and parallel to adjacent edges of said board, a pair of projections from said square engaging respectively in said slots to guide said square over the surface of the sensitised material, means for clamping said square in an adjusted position and a pair of straight blades mounted to move over the surface of the sensitised material and guided to move with their inner edges respectively parallel to the inner edges of said square.

2. An exposure and masking appliance for photographic sensitised material, comprising a substantially rectangular board for supporting the sensitised material and formed with a pair of parallel slots inclined to the edges of said board and extending from the neighborhood of one corner of said board, a square or member with two arms having their inner edges at right angles and parallel to adjacent edges of said board, a pair of projections from said square and engaging respectively in said slots to guide said square over the surface of the sensitised material, means for clamping said square in an adjusted position, a plate with inner edges at right angles and mounted to slide immediately below said square, means for guiding said plate with its inner edges parallel to the inner edges of said square and a pair of straight blades mounted to move over the surface of the sensitised material and guided to move with their inner edges respectively parallel to the inner edges of said square.

3. An exposure and masking appliance for photographic sensitised material, comprising a substantially rectangular board for supporting the sensitised material and formed with a pair of parallel slots inclined to the edges of said board and extending from the neighborhood of one corner of said board, a square or member with two arms having their inner edges at right angles and parallel to adjacent edges of said board, a pair of projections from said square and engaging respectively in said slots to guide said square over the surface of the sensitised material, means for clamping said square in an adjusted position, a plate with inner edges at right angles mounted to slide immediately below said square, means for guiding said plate with its inner edges parallel to the inner edges of said square and a pair of straight blades mounted to move over the surface of the sensitised material and guided to move with their inner edges respectively parallel to the inner edges of said square, said blades being each formed with a localized series of small windows extending across the width thereof and permitting inspection of the edges of the sensitised material.

4. An exposure and masking appliance for photographic sensitised material, comprising a substantially rectangular board for supporting the sensitised material and formed with a pair of parallel slots inclined to the edges of said board and extending from the neighbourhood of one corner of said board, a square or member with two arms having their inner edges at right angles and parallel to adjacent edges of said board, a pair of projections from said square and engaging respectively in said slots to guide said square over the surface of the sensitised material, means for clamping said square in an adjusted position, a plate with inner edges at right angles mounted to slide immediately below said square, means for guiding said plate with its inner edges parallel to the inner edges of said square and a pair of straight blades mounted to move over the surface of the sensitised material and guided to move with their inner edges respectively parallel to the inner edges of said square, said square being shaped with an inclined outer edge crossing an outer edge of said plate and bearing indicia for indicating the margin between the inner edges of said square and said plate.

5. An exposure and masking appliance for photographic sensitised material, comprising a substantially rectangular board for supporting the sensitised material and formed with a pair of parallel slots inclined to the edges of said board and extending from the neighbourhood of one corner of said board, a square or member with two arms having their inner edges at right angles and parallel to adjacent edges of said board, a pair of projections from said square and engaging respectively in said slots to guide said square over the surface of the sensitised material, means for clamping said square in an adjusted position, a plate with inner edges at right angles mounted to slide immediately below said square, means for guiding said plate with its inner edges parallel to the inner edges of said square, a pair of straight blades mounted to move over the surface of the sensitised material and guided to move with their inner edges respectively parallel to the inner edges of said square, said blades being each formed with a localized series of small windows extending across the width thereof permitting inspection of the edges of the sensitised material, and sections of transparent material passing a safe light and covering the windows formed in said blades.

6. An exposure and masking appliance for photagraphic sensitised material, comprising a substantially rectangular board for supporting the sensitised material and formed with a pair of parallel slots inclined to the edges of said board and extending from the neighbourhood of one corner of said board, a square or member with two arms having their inner edges at right angles and parallel to adjacent edges of said board, a pair of projections from said square and engaging respectively in said slots to guide said square over the surface of the sensitised material, means for clamping said square in an adjusted position, a plate with inner edges at right angles mounted to slide immediately below said square, shaped with an edge parallel to said slots and formed with a slot registering with one of said first-mentioned slots and engaged by one of said projections, a guide pin upstanding from said board and contacting said last-mentioned edge, and a pair of straight blades mounted to move over the surface of the sensitised material and guided to move with their inner edges respectively parallel to the inner edges of said square.

7. An exposure and masking appliance for photographic sensitised material, comprising a board for supporting the sensitised material, a member mounted to slide over the surface of the board and having two arms whose inner edges are at right angles, said mounting comprising a pair of spaced parallel links each pivoted at one end to said board and at the other end to one arm of said square, a pair of parallel straight blades, means to mount said blades to move over said square and to guide the blades to move with their inner edges parallel to the inner edge of one arm of said square and a second pair of parallel straight blades, means to mount said second pair of blades to move over said first pair of blades and to guide the same to move with their inner edges parallel to the inner edge of the other arm of said square.

8. In a photographic exposure and masking appliance, a board for supporting sensitised material, a substantially open rectangular frame hinged along one edge of said board and conforming to the other edges thereof, a member mounted to slide over the surface of the board and having two arms whose inner edges are at right angles, said mounting comprising a pair of spaced parallel links each pivoted at one end to said board and at the other end to one arm of said square, a pair of parallel straight blades, means to mount said blades upon said frame to move over said square and to guide the blades to move with their inner edges parallel to the inner edge of one arm of said square and a second pair of parallel straight blades, means to mount said second pair of blades upon said frame to move over said first pair of blades and to guide the same to move with their inner edges parallel to the inner edge of the other arm of said square.

9. In a photographic exposure and masking appliance, a board for supporting sensitized material, a plurality of movable masking members presenting four straight inner edges defining a rectangular area, means to mount and to guide and to enable said masking members to move over said board with their inner edges defining a rectangular area having the same center as, and sides mutually parallel to, the center and sides respectively of each rectangular area so defined by said masking members, a movable locating member for the sensitized material comprising a square having two arms whose inner edges are at right angles, and means to mount and to guide said square to move over said board with its inner edges respectively parallel to the mutually adjacent sides of the rectangle defined by said masking members.

10. In a photographic exposure and masking appliance, a board for supporting sensitized material, a substantially open rectangular frame hinged along one edge of said board and conforming to the other edges thereof, masking means including at least two movable mutually perpendicular straight blades and also including movable masking means presenting two mutually perpendicular edges respectively opposed to the inner edges of said blades and defining therewith a rectangular space, means for slidably mounting each of said blades on said frame to move across the board in the direction perpendicular to its own length, means to mount and to guide said other masking means to move across the board with its inner edges always respectively parallel to the opposed inner edges of said blades, a locating member for said sensitized material comprising a square having two arms whose inner edges are at right angles, means to mount said square on the board and to guide it to move across the board beneath the masking means with its inner edges respectively parallel to the mutually adjacent sides of the rectangular space defined by the masking means.

DOUGLAS GORDON HUNTER.